United States Patent
Ota et al.

(10) Patent No.: US 8,958,402 B2
(45) Date of Patent: Feb. 17, 2015

(54) WIRELESS COMMUNICATION SYSTEM, WIRELESS COMMUNICATION DEVICE, PROJECTOR, AND WIRELESS COMMUNICATION METHOD

(75) Inventors: Koichiro Ota, Omachi (JP); Kazuyoshi Kitabayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1044 days.

(21) Appl. No.: 13/022,041

(22) Filed: Feb. 7, 2011

(65) Prior Publication Data

US 2011/0222518 A1 Sep. 15, 2011

(30) Foreign Application Priority Data

Mar. 9, 2010 (JP) ................................. 2010-051460

(51) Int. Cl.
| | | |
|---|---|---|
| *H04W 4/00* | (2009.01) | |
| *H04W 48/12* | (2009.01) | |
| *H04W 48/20* | (2009.01) | |
| *H04W 84/18* | (2009.01) | |

(52) U.S. Cl.
CPC .............. *H04W 48/12* (2013.01); *H04W 48/20* (2013.01); *H04W 84/18* (2013.01)
USPC ....................................................... 370/338

(58) Field of Classification Search
CPC ..... H04W 48/12; H04W 48/20; H04W 84/02; H04W 84/18
USPC ......................................................... 370/338
See application file for complete search history.

(56) References Cited

U.S. PATENT DOCUMENTS

| | | | |
|---|---|---|---|
| 7,603,710 B2 * | 10/2009 | Harvey et al. .................... | 726/23 |
| 7,768,943 B1 * | 8/2010 | Troxel et al. ................... | 370/254 |
| 7,864,722 B2 * | 1/2011 | Yi et al. .......................... | 370/312 |
| 7,864,744 B2 * | 1/2011 | Song et al. ..................... | 370/341 |
| 2003/0026211 A1 * | 2/2003 | Xu et al. ......................... | 370/252 |
| 2004/0103282 A1 * | 5/2004 | Meier et al. .................... | 713/171 |
| 2004/0179488 A1 * | 9/2004 | Kim et al. ...................... | 370/324 |
| 2005/0036509 A1 * | 2/2005 | Acharya et al. ............... | 370/466 |
| 2005/0174953 A1 * | 8/2005 | Ho ................................. | 370/310 |
| 2005/0255847 A1 * | 11/2005 | Han et al. ....................... | 455/436 |
| 2006/0067290 A1 | 3/2006 | Miwa et al. | |
| 2006/0221858 A1 * | 10/2006 | Switzer et al. ................ | 370/254 |
| 2007/0045424 A1 * | 3/2007 | Wang ........................ | 235/462.46 |

(Continued)

FOREIGN PATENT DOCUMENTS

| | | |
|---|---|---|
| CN | 101277242 A | 10/2008 |
| CN | 101278522 A | 10/2008 |

(Continued)

*Primary Examiner* — Asad Nawaz
*Assistant Examiner* — Kai Chang
(74) *Attorney, Agent, or Firm* — Oliff PLC (57) ABSTRACT

A wireless communication system performs ad-hoc mode communication, wherein a first terminal includes an identification information storing section, an IP address storing section, an SSID generating section generating a service set identifier, a beacon signal generating section generating a beacon signal including an SSID, and a priority information updating section updating priority information, and the second terminal includes an SSID acquiring section acquiring the SSID from the beacon signal, memory storing the SSID, an SSID selecting section selecting one SSID based on the priority information, an IP address acquiring section acquiring the IP address of the first terminal from the selected SSID, and a communicating section making a connection to the first terminal by using the acquired IP address.

12 Claims, 7 Drawing Sheets

(56) References Cited

U.S. PATENT DOCUMENTS

| | | |
|---|---|---|
| 2007/0171910 A1 | 7/2007 | Kumar |
| 2007/0264973 A1* | 11/2007 | Dowek et al. .................. 455/411 |
| 2008/0240068 A1 | 10/2008 | Ishimoto |
| 2008/0293404 A1* | 11/2008 | Scherzer et al. ............ 455/426.1 |
| 2009/0034546 A1* | 2/2009 | Nagata .......................... 370/401 |
| 2009/0073943 A1* | 3/2009 | Krishnaswamy et al. .... 370/338 |
| 2009/0232086 A1* | 9/2009 | Li et al. .......................... 370/330 |

FOREIGN PATENT DOCUMENTS

| | | |
|---|---|---|
| JP | A 2005-254301 | 9/2005 |
| JP | A 2005-323117 | 11/2005 |

* cited by examiner

| FIELD | NUMBER OF CHARACTERS | OUTLINE |
|---|---|---|
| DEVICE NAME | 30 CHARACTERS | IDENTIFICATION INFORMATION OF DEVICE (REMAINING SPACE IS LEFT BLANK) |
| ADDRESS SERIES | 2 CHARACTERS | ITEM NUMBER IN IP ADDRESS SERIES TABLE |

FIG. 4A

| ITEM NUMBER | IP ADDRESS |
|---|---|
| 01 | 192.168.0.1 |
| 02 | 192.168.0.2 |
| 03 | 192.168.0.3 |
| 04 | 192.168.0.4 |
| 10 | 172.16.0.1 |
| 11 | 172.16.0.2 |
| 12 | 172.16.0.3 |
| 13 | 172.16.0.4 |
| 21 | 10.0.0.1 |
| 22 | 10.0.0.2 |
| 23 | 10.0.0.3 |
| 24 | 10.0.0.4 |

FIG. 4B

| FIELD | NUMBER OF CHARACTERS | OUTLINE |
|---|---|---|
| DEVICE NAME | 22 CHARACTERS | IDENTIFICATION INFORMATION OF DEVICE (REMAINING SPACE IS LEFT BLANK) |
| PRIORITY | 2 CHARACTERS | COUNTER VALUE INDICATING PRIORITY (=0~99) |
| ADDRESS INFORMATION | 8 CHARACTERS | IP ADDRESS OF DEVICE (IP ADDRESS IS GIVEN IN HEXADECIMAL) |

FIG. 5A

| PRIORITY FIELD | $|X-Y| \leqq 50$ | $|X-Y| > 50$ |
|---|---|---|
| X-Y>0 | X HAS HIGHER PRIORITY | Y HAS HIGHER PRIORITY |
| X-Y<10 | Y HAS HIGHER PRIORITY | X HAS HIGHER PRIORITY |
| X-Y=0 | X AND Y HAVE THE SAME PRIORITY | (IMPOSSIBLE) |

WIRELESS COMMUNICATION SYSTEM, WIRELESS COMMUNICATION DEVICE, PROJECTOR, AND WIRELESS COMMUNICATION METHOD

CROSS-REFERENCE

The entire disclosure of Japanese Patent Application No. 2010-051460 filed Mar. 9, 2010 is expressly incorporated by reference herein.

BACKGROUND

1. Technical Field

The present invention relates to technologies for wirelessly transmitting data to a projector.

2. Related Art

As a network configuration of a wireless network, there are infrastructure mode in which devices perform communication with each other via a base station and ad-hoc mode in which the devices perform communication directly with each other. Each device identifies a wireless network by using a service set identifier (SSID) and connects to a wireless network having a common SSID. In infrastructure mode, an SSID is usually set in advance by an administrator of the network, and an IP address is usually set automatically by the base station. Each device can perform communication by using the IP address and the SSID. On the other hand, in ad-hoc mode, an administrator of the wireless network is not present. Therefore, in ad-hoc mode, one device (hereinafter referred to as a "master unit") generates an independent basic service set (IBSS) network and an SSID for identifying an IBSS network, and sends a beacon signal including the SSID. Other devices (hereinafter referred to as "slave units") can take part in a wireless network (an IBSS network) corresponding to the SSID by receiving the SSID and setting the SSID in a wireless adapter. Here, communication in which the other party is identified requires the IP address of the other party. In the past, the technologies for allowing a master unit to inform a slave unit of the IP address of the master unit by providing the SSID included in the beacon signal with the IP address have been known (see, for example, JP-A-2005-323117 and JP-A-2006-254301).

Incidentally, when the technologies which provide the SSID included in the beacon signal with an IP address are used, if the IP address of the master unit is changed, the master unit generates the SSID again and transmits the SSID. Here, since it takes time to perform scanning via a wireless network, a slave unit sometimes accumulates the acquired SSID information for a predetermined period. In such a case, the slave unit has a plurality of SSIDs, that is, an SSID acquired before address change and an SSID acquired after address change. In this case, even though the wireless networks are generated by the same master unit, the slave unit cannot determine which of the wireless networks corresponding to the SSIDs is a wireless network to which the slave unit makes connection.

SUMMARY

An advantage of some aspects of the invention is to solve at least part of the problems described above and improve the convenience of wireless communication in ad-hoc mode.

The invention can be realized as forms or application examples described below.

APPLICATION EXAMPLE 1

According to this application example, there is provided a wireless communication system which performs communication between first and second terminals in ad-hoc mode, wherein the first terminal includes an identification information storing section storing identification information of the first terminal, an IP address storing section storing an IP address of the first terminal, service set identifier generating section generating a service set identifier by using priority information indicating priority of wireless connection, the identification information, and the IP address, a priority information updating section updating the priority information every time the service set identifier is generated, and a beacon signal generating section generating a beacon signal including the service set identifier, and the second terminal includes a service set identifier acquiring section acquiring the service set identifier from the beacon signal, memory storing the service set identifier as a candidate for selection, a service set identifier selecting section selecting, when a plurality of service set identifier candidates having the same identification information are stored in the memory, one service set identifier from the plurality, of candidates based on the priority information, an IP address acquiring section acquiring the IP address of the first terminal from the selected service set identifier, and a communicating section making a connection to the first terminal by using the acquired IP address.

According to this application example, even when the IP address of the first terminal is changed and the SSID is changed, the second terminal can select one service set identifier based on the updated priority information. This makes it possible to improve the convenience of wireless communication in ad-hoc mode.

APPLICATION EXAMPLE 2

In the wireless communication system, a firewall is set in the second terminal, and the communicating section establishes wireless communication between the first and second terminals by transmitting a unicast packet including the IP addresses of the first and second terminals to the first terminal and receiving a response to the unicast packet from the first terminal.

According to this application example, even when a firewall is set in the second terminal, a response from the first terminal is not rejected.

APPLICATION EXAMPLE 3

In the wireless communication system, the service set identifier includes check information for checking correctness of the service set identifier.

According to this application example, it is possible to find out an SSID faked by the third party.

APPLICATION EXAMPLE 4

In the wireless communication system, the first and second terminals each store an address series table for establishing correspondence between IP address related information and the IP address.

According to this application example, the SSID does not include the IP address itself. Therefore, the third party cannot acquire the IP address of the first terminal even when the third party receives the SSID sent from the first terminal.

APPLICATION EXAMPLE 5

According to this application example, there is provided a wireless communication device performing communication in ad-hoc mode, including: an identification information storing section storing identification information; an IP address storing section storing an IP address; a service set identifier generating section generating a service set identifier by using priority information indicating priority of wireless connection, the identification information, and the IP address; a priority information updating section updating the priority information every time the service set identifier is generated; and a beacon signal generating section generating a beacon signal including the service set identifier.

According to this application example, even when the IP address of the wireless communication device is changed and the SSID is changed, it is possible to select one service set identifier based on the priority information. This makes it possible to improve the convenience of wireless communication in ad-hoc mode.

APPLICATION EXAMPLE 6

According to this application example, there is provided a projector projecting an image corresponding to data received from an information terminal, including: the wireless communication device described in the application example described above, the wireless communication device for receiving the data; a CPU converting the received data into projection data; and an image projection mechanism projecting an image based on the projection data.

According to this application example, even when the IP address of the projector is changed and the SSID is changed, it is possible to make a connection to an information terminal which supplies data to the projector with reliability and project an image corresponding to the supplied data.

APPLICATION EXAMPLE 7

According to this application example, there is provided a wireless communication method for performing communication between first and second terminals in ad-hoc mode, including: sending a beacon signal including a service set identifier including IP address related information related to an IP address of the first terminal, priority information indicating priority of wireless connection, and identification information of the first terminal; acquiring the service set identifier from the beacon signal and storing the service set identifier in memory of the second terminal as a candidate for selection; when a plurality of service set identifier candidates having the same identification information are stored in the memory, selecting one service set identifier from the plurality of candidates based on the priority information; acquiring the IP address of the first terminal from the IP address related information of the selected service set identifier; and making a connection to the first terminal by using the acquired IP address.

According to this application example, even when the IP address of the first terminal is changed and the SSID is changed, the second terminal can select one service set identifier based on the priority information. This makes it possible to improve the convenience of wireless communication in ad-hoc mode.

APPLICATION EXAMPLE 8

In the wireless communication method, the second terminal sets a firewall, transmits a unicast packet including the IP addresses of the first and second terminals to the first terminal, and establishes wireless communication between the first and second terminals by receiving a response to the unicast packet from the first terminal.

According to this application example, even when a firewall is set in the second terminal, a response from the first terminal is not rejected.

APPLICATION EXAMPLE 9

In the wireless communication method, the service set identifier includes check information for checking correctness of the service set identifier.

According to this application example, it is possible to find out an SSID faked by the third party.

APPLICATION EXAMPLE 10

In the wireless communication method, the first and second terminals establish correspondence between the IP address related information and the IP address.

According to this application example, the SSID does not include the IP address itself. Therefore, the third party cannot acquire the IP address of the first terminal even when the third party receives the SSID sent from the first terminal.

The invention can be realized in various forms such as a network communication method in ad-hoc mode in addition to a wireless communication system.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
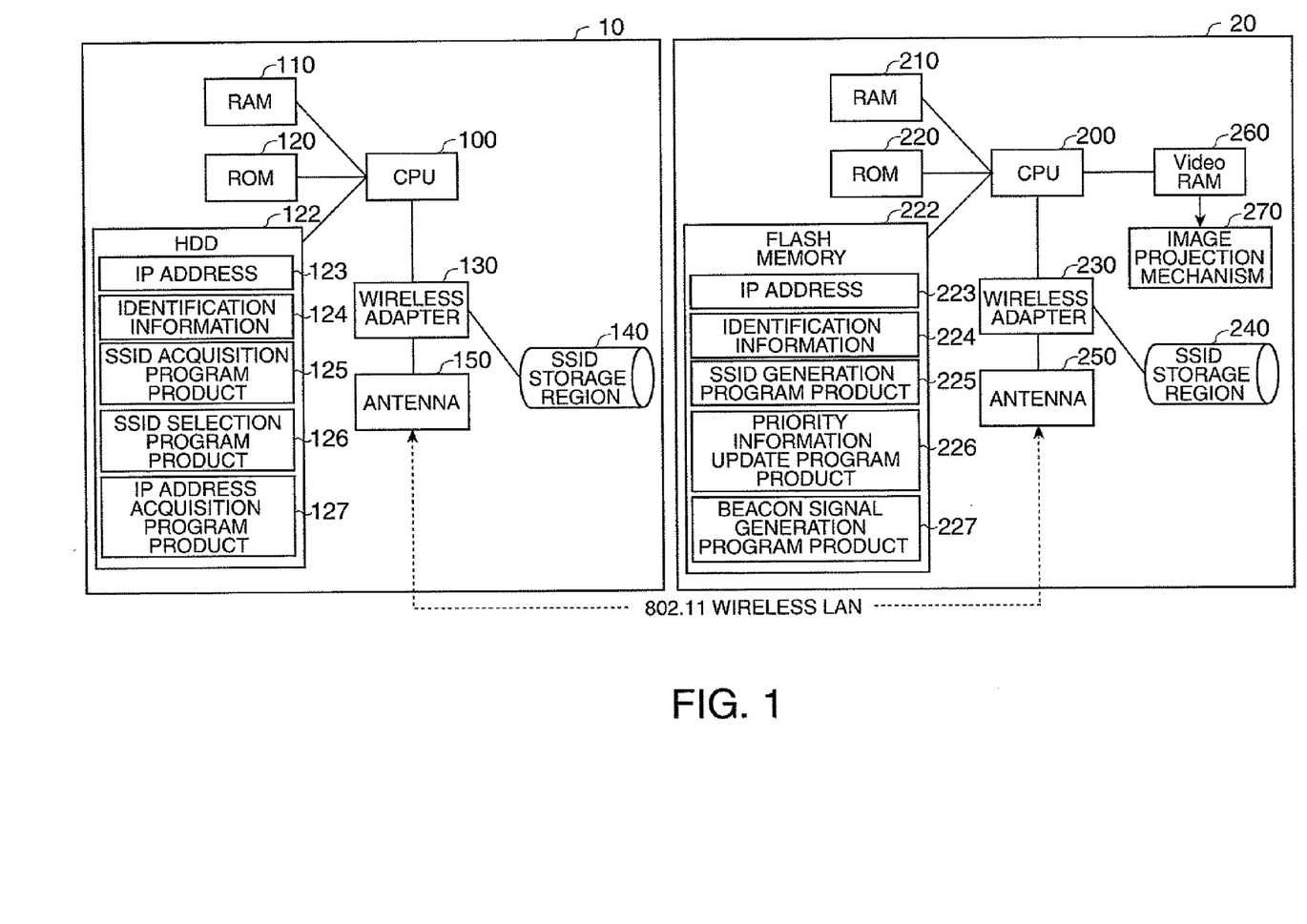
FIG. 1 is an explanatory diagram showing a wireless communication system according to a first embodiment.

FIG. 1 is an explanatory diagram showing a wireless communication system according to a first embodiment. The wireless communication system includes a personal computer 10 and a projector 20. The personal computer 10 includes a CPU 100, RAM 110, ROM 120, a hard disk 122, a wireless adapter 130, and an antenna 150. The wireless adapter 130 includes a service set identifier (SSID) storage region 140. The wireless adapter 130 corresponds to a "communicating section" in the claims, and the service set identifier storage region 140 corresponds to "memory storing a service set identifier as a candidate for selection" in the claims.

The hard disk 122 includes an IP address storing section 123, an identification information storing section 124, an SSID acquisition program product 125, an SSID selection program product 126, and an IP address acquisition program product 127. Here, the IP address which is stored in the IP address storing section 123 is the IP address of the personal computer 10. The identification information which is stored in the identification information storing section 124 is the identification information of the personal computer 10. The SSID acquisition program product 125 acquires an SSID from a beacon signal received from the projector 20, the SSID used when communication with the projector 20 performed. When there are a plurality of acquired SSIDs, the SSID selection program product 126 selects one SSID from the plurality of SSIDs. The IP address acquisition program product 127 acquires an IP address of the projector 20 from the acquired SSID of the projector 20. The SSID acquisition program product 125 corresponds to a "service set identifier acquiring section" in the claims, the SSID selection program product 126 corresponds to a "service set identifier selecting section" in the claims, and the IP address acquisition program product 127 corresponds to an "IP address acquiring section" in the claims.

The projector 20 includes a CPU 200, RAM 210, ROM 220, flash memory 222, a wireless adapter 230, an antenna 250, a Video RAM 26, and an image projection mechanism 270. The wireless adapter 230 includes a service set identifier (SSID) storage region 240.

The flash memory 222 includes an IP address storing section 223, an identification information storing section 224, an SSID generation program product 225, a priority information update program product 226, and a beacon signal generation program product 227. Here, the IP address which is stored in the IP address storing section 223 is the IP address of the projector 20. The identification information which is stored in the identification information storing section 224 is the identification information of the projector 20. By using the IP address stored in the IP address storing section 223 and the identification information stored in the identification information storing section 224, the SSID generation program product 225 generates an SSID which is used when communication with the computer 10 is performed. The priority information update program product 226 updates the priority information every time the SSID generation program product 225 generates an SSID. The beacon signal generating section 227 generates a beacon signal including an SSID. The SSID generation program product 225 corresponds to a "service set identifier generating section" in the claims, the priority information update program product 226 corresponds to a "priority information updating section" in the claims, and the beacon signal generating section 227 corresponds to a "beacon signal generating section" in the claims.

The projector 20 projects the data received from the personal computer 10 onto a screen (not shown). This is performed in the manner described below. First, the CPU 100 of the personal computer 10 generates data to be projected by the projector 20. Then, the CPU 100 transmits the data to the projector 20 by using the wireless adapter 130 and the antenna 150. Here, the wireless adapter 130 of the personal computer 10 and the wireless adapter 230 of the projector 20 form a wireless LAN specified by IEEE 802.11, for example. The CPU 200 of the projector 20 receives the data by using the antenna 250 and the wireless adapter 230. The CPU 200 converts the received data into projection data, and writes the projection data into the Video RAM 260. The image projection mechanism 270 reads the data in the Video RAM 260, and projects the data onto the screen (not shown). Incidentally, the structure of the image projection mechanism 270 is a structure usually used in the projectors, and therefore the descriptions thereof are omitted.

In this embodiment, the personal computer 10 and the projector 20 perform communication directly with each other without using a base station, in other words, perform communication in ad-hoc mode. In ad-hoc mode, either the personal computer 10 or the projector 20 has to generate an independent basic service set (IBSS) network and an SSID corresponding to the IBSS network. In this embodiment, the projector 20 generates an IBSS network and an SSID corresponding to the IBSS. The SSID is used to identify the IBSS network. The IBSS network is an independent network which is identified by the SSID, and any device can take part in the IBSS network by matching the SSID with that of the IBSS network.

Figure 2A:
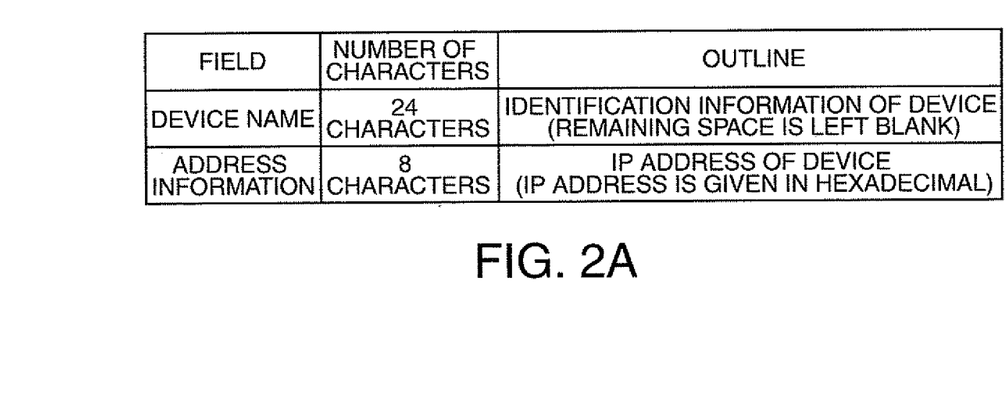
FIGS. 2A and 2B are explanatory diagrams showing the structure of an SSID which is generated by a projector.
Figure 2B:
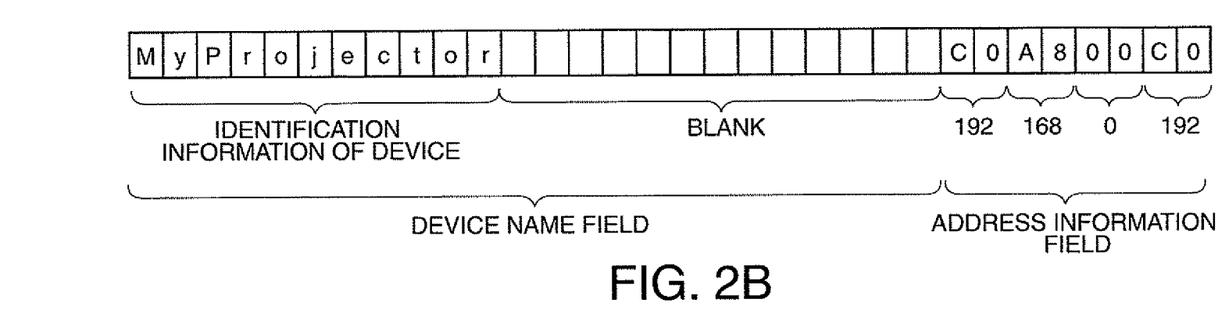

FIGS. 2A and 2B are explanatory diagrams showing the structure of an SSID which is generated by a projector. In this embodiment, in the generation of an SSID, the CPU 200 of the projector 20 generates identification information for identifying the projector 20 and an SSID including the IP address of the projector 20. The SSID is formed of up to 32 characters, and the IP address can be represented by 8 characters in the case of IPV4. Therefore, the CPU 200 can assign up to 24 characters to the identification information of the device. Hereinafter, descriptions will be given on the assumption that an SSID is formed of 32 characters. In this embodiment, a region in which the identification information of the device is stored is referred to as a device name field, and a region in which the IP address is stored is referred to as an address information field. In this embodiment, the CPU 200 (FIG. 1) assigns the first 24 characters of 32 characters of an SSID to the device name field, and assigns the remaining 8 characters to the address information field. In this embodiment, the identification information of the device is "MyProjector", and the IP address is "192.168.0.192". The CPU 200 assigns "MyProjector" to the device name field from the beginning thereof in this order, and leaves the remaining space blank. Incidentally, the CPU 200 may assign NULL to the remaining space instead of leaving the space blank. The CPU 200 assigns "C0A800C0" which is the IP address "192.168.0.192" given in hexadecimal to the address information field (the remaining 8-character field). The CPU 200 stores the generated SSID in the SSID storage region 240 (FIG. 1), and intermittently sends a beacon signal including the SSID at predetermined intervals.

Figure 3:
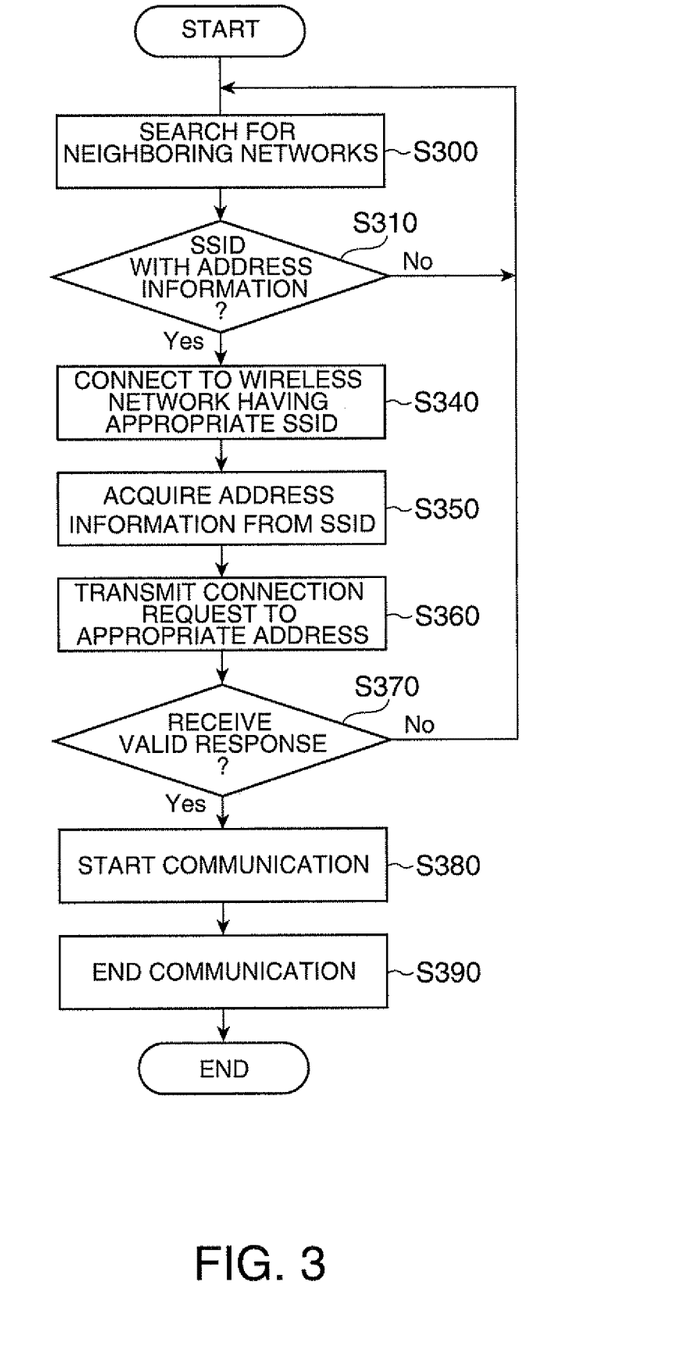
FIG. 3 is an operation flowchart of a personal computer.

FIG. 3 is an operation flowchart of the personal computer. In step S300, the CPU 100 (FIG. 1) of the personal computer 10 searches for neighboring wireless networks. Specifically, the CPU 100 determines whether or not a beacon signal is sent from the projector 20 (FIG. 1). If the beacon signal is sent, the CPU 100 receives the beacon signal and acquires an SSID from the beacon signal. In this embodiment, the SSID has values shown in FIGS. 2A and 2B.

In step S310, the CPU 100 determines whether or not the SSID includes an IP address. The maximum value of the IP address is "255.255.255.255". Therefore, when the IP address is given in hexadecimal, the characters used therein are 0 to 9 and A to F. Thus, when the lower 8 characters of the SSID are only these characters (any of 0 to 9 or A to F), the CPU 100 can determine that these 8 characters represent the IP address. If the SSID includes the IP address, the CPU 100 stores the received SSID in the own SSID storage region 140, and proceeds to step S340. If the SSID does not include the IP address, the CPU 100 goes back to step S300, and continuously searches for networks.

In step S340, the CPU 100 connects to the network (IBSS network) identified by the SSID. Incidentally, at this stage, the personal computer 10 can merely take part in the IBSS network. The personal computer 10 needs the IP address of the projector 20 to perform communication directly with the projector 20.

In step S350, the CPU 100 acquires the IP address from the SSID. The CPU 100 extracts 8 characters in the address information field. Since the 8 characters are formed of any of 0 to 9 or A to F as described above, the CPU 100 can determine that they are an 8-digit hexadecimal number. The CPU 100 generates a 32-bit IP address from the 8-digit hexadecimal number.

In step S360, the CPU 100 of the personal computer 10 transmits a unicast packet to the IP address acquired in step S350, and issues a connection request. To perform mutual communication between the personal computer 10 and the projector 20, the personal computer 10 and the projector 20 have to perform communication by identifying the IP address of the other party. The CPU 100 of the personal computer 10 knows the IP address of the projector 20, but the CPU 200 of the projector 20 does not know the IP address of the personal computer 10. By transmitting the unicast packet as described above, the CPU 100 can inform the CPU 200 of the projector 20 of the IP address of the personal computer 10. Here, unicast means specifying a single IP address and transmitting data.

Incidentally, when the CPU 100 of the personal computer 10 sends a broadcast packet, the following problem arises. Here, sending a broadcast packet means sending data to all the devices connected to the network. The CPU 100 usually specifies a unique address (a broadcast address) indicating the entire network and sends a packet. The projector 20 which has received the broadcast packet returns a response packet to the personal computer by unicast. Here, when the personal computer 10 is placed in a firewall, the firewall may reject the response packet to the broadcast packet.

Therefore, it is preferable that the CPU 100 send a unicast packet as described above.

If the CPU 100 receives a valid response packet in step S370, the CPU 100 proceeds to step S380, and performs data communication with the CPU 200 of the projector 20. When the CPU 100 sends all the data to the projector 20, the CPU 100 ends the communication in step S390. If the CPU 100 does not receive a valid response packet in step S370, the CPU 100 goes back to step S300, and searches for other networks.

As described above, according to this embodiment, the CPU 200 of the projector 20 provides an SSID generated thereby with an IP address. The CPU 100 of the personal computer 10 acquires the IP address of the projector 20 from the received SSID, and transmits data to the IP address. Therefore, in ad-hoc mode, it is possible to perform communication between the personal computer 10 and the projector 20.

Moreover, in this embodiment, the CPU 100 of the personal computer 10 which has received the SSID specifies the IP address of the projector 20 and sends a unicast packet. Therefore, even when the personal computer 10 is placed in the firewall, a response packet from the projector 20 is not rejected by the firewall.

Second Embodiment

Figure 4A:
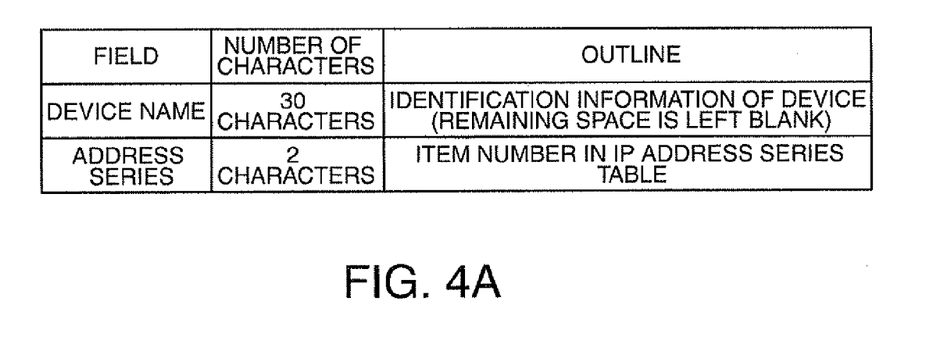
FIGS. 4A and 4B are explanatory diagrams showing an SSID in a second embodiment.
Figure 4B:
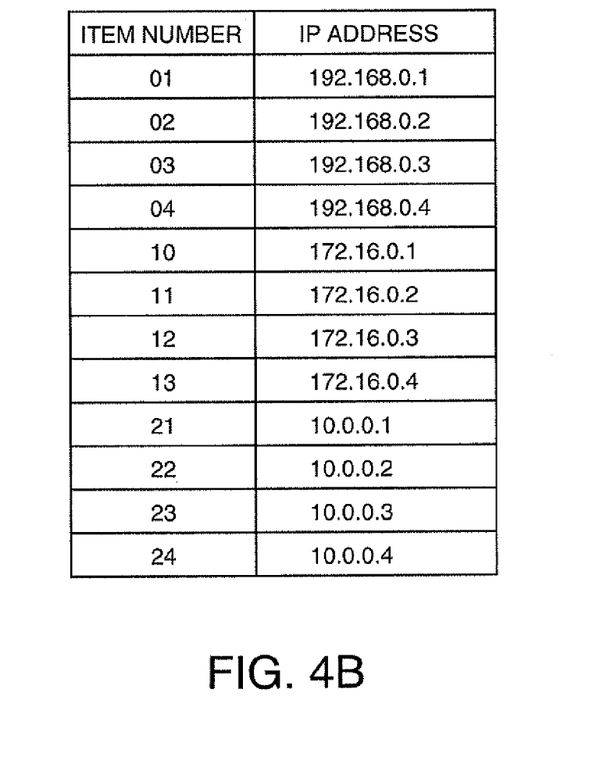

FIGS. 4A and 4B are explanatory diagrams showing an SSID in a second embodiment. In the second embodiment, an SSID is not provided with an IP address itself of the projector 20, but with an item number of an address series corresponding to the IP address. FIG. 4A shows the structure of an SSID in the second embodiment. In this embodiment, 30 characters are assigned to a device name field, and 2 characters are assigned to an address series field. FIG. 4B is a table of correspondence between the item number of the address series and the IP address. The item number and the IP address have one-to-one correspondence. For example, when the item number is "01", a corresponding IP address is "192.168.0.1". The correspondence table is stored in both the personal computer 10 and the projector 20.

Since an operation flowchart of this embodiment is almost the same as the operation flowchart of the first embodiment, only a difference will be described. In step S350, the CPU 100 acquires the IP address of the projector. Here, in the second embodiment, unlike the first embodiment, the SSID does not include the IP address itself. In step S350, the CPU 100 first acquires the item number of the address series. The CPU 100 then acquires a corresponding IP address by using the table of correspondence between the item number of the address series and the IP address and using the item number of the address series as a key.

According to the second embodiment, the SSID does not include the IP address itself. Therefore, the third party cannot acquire the IP address of the projector 20 even when the third party receives the SSID sent from the projector 20. As a result, it is possible to prevent unauthorized access to and attack on the projector 20. Incidentally, the IP address of the first embodiment and the item number of the address series of the second embodiment are collectively referred to as "IP address related information". The IP address related information includes both the IP address itself and information corresponding to the IP address. Incidentally, in this embodiment, 2 characters are assigned to the address series field; however, any number of characters can be selected as the number of characters assigned to the address series field as long as the total number of characters of an SSID is 32 characters or less.

Third Embodiment

Figure 5A:
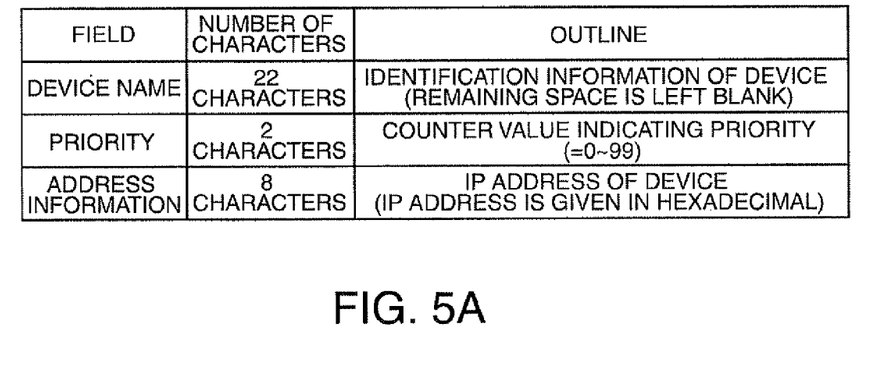
FIGS. 5A and 5B are explanatory diagrams showing an SSID in a third embodiment.
Figure 5B:
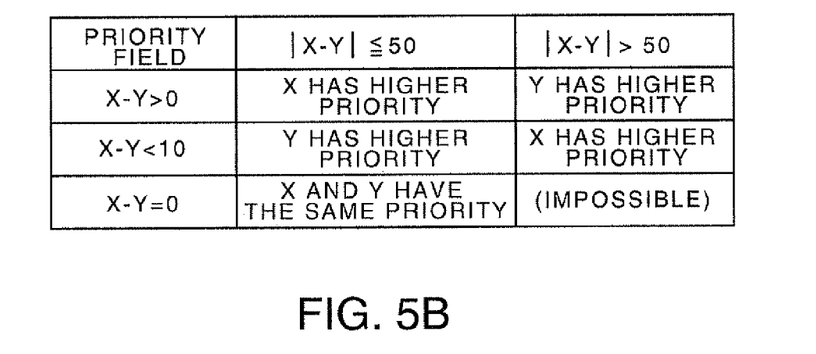

FIGS. 5A and 5B are explanatory diagrams showing an SSID in a third embodiment. FIG. 5A shows the structure of an SSID in the third embodiment. The SSID of the third embodiment differs from the SSID of the first embodiment in that it is provided with a priority field for 2 characters. A two-digit number is assigned to the priority field. The CPU 200 of the projector 20 increments the value of the priority field by 1 every time the IP address is changed. When the IP address is changed when the value of the priority field is 99, the CPU 200 restores the value of the priority field to 0 (00). The value of the priority field is restored to zero when the IP address is changed when the value of the priority field is a predetermined value.

Figure 6:
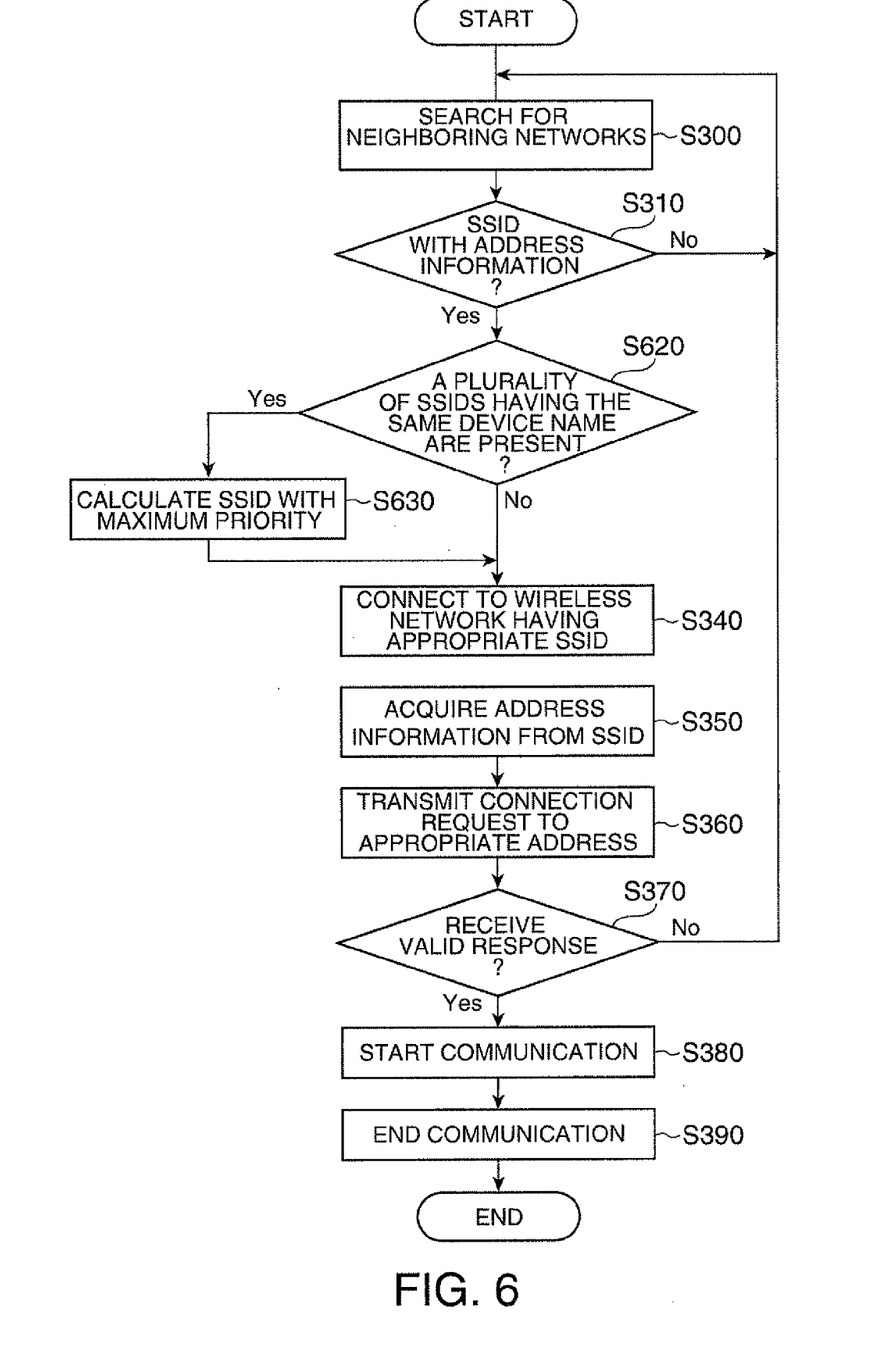
FIG. 6 is an operation flowchart of a personal computer in the third embodiment.

FIG. 6 is an operation flowchart of the personal computer in the third embodiment. The same steps in the operation of the personal computer in the third embodiment as those in the operation in the first embodiment are identified with the same step numbers, and the descriptions thereof will be omitted.

In the third embodiment, steps S620 and S630 are performed between steps S310 and S340 of the first embodiment. In step S620, the CPU 100 determines whether or not the SSIDs stored in the SSID storage region 140 include a plurality of SSIDs having the same identification information in the device name fields of the SSIDs. If there is only one SSID, the CPU 100 selects the SSID and proceeds to step S340. If there are a plurality of such SSIDs, the CPU 100 proceeds to step S630 and determines which SSID is used.

In step S630, the CPU 100 determines which SSID to select. FIG. 5B is a comparison table for determining which SSID has higher priority. An SSID having a greater priority information value has higher priority. As described above, since the priority information is restored to zero when the IP address is changed when the value of the priority field is a predetermined value, the CPU 100 determines the SSID to which higher priority is given by considering the above fact. Assume that the value in the priority field of one SSID stored in the SSID storage region 140 is X and the value in the priority field of the other SSID is Y. The CPU 100 obtains the value of X−Y and the value of |X−Y|. Then, the CPU 100 determines whether the value of X−Y is more than 0, less than 0, or equal to 0. Next, the CPU 100 determines whether the value of |X−Y| is equal to or less than 50 or more than 50. For example, when X=25 and Y=60, X−Y=25−60<0 and |X−Y|=|25−60|≤50. Therefore, the CPU 100 determines that Y has higher priority. In this case, the CPU 100 selects an SSID having Y as a value in the priority field. Moreover, for example, when X=10 and Y=90, X−Y=10−90<0 and |X−Y|=|110−90|>50. Therefore, the CPU 100 determines that X has higher priority. In this case, the CPU 100 selects an SSID having X as a value in the priority field. Incidentally, when X−Y=0 (X=Y), the two SSIDs are the same, and therefore X and Y have the same priority. The CPU 100 selects the SSIDs. It is to be noted that, in this case, since the value of X−Y is 0, the value of |X−Y| does not become more than 50.

As described above, according to this embodiment, the CPU 100 selects an SSID based on the value in the priority field. Therefore, the CPU of the personal computer 10 sends a unicast packet to the IP address which is currently used by the projector, and does not send a unicast packet to the IP address which is not used by the projector 20. This makes it possible to improve the convenience of wireless communication in ad-hoc mode. In this embodiment, the number of characters in the priority field is two; however, any number of characters can be adopted.

Fourth Embodiment

Figure 7A:
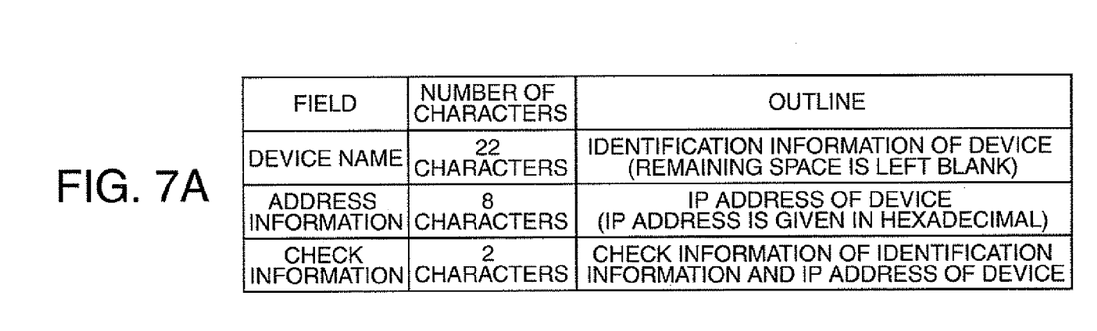
FIGS. 7A to 7D are explanatory diagrams showing an SSID in a fourth embodiment.

FIGS. 7A to 7D are explanatory diagrams showing an SSID in a fourth embodiment. FIG. 7A shows the structure of an SSID. The fourth embodiment is obtained by adding a check information field to an SSID in the first embodiment. Incidentally, the number of characters in the device name field is reduced by the number of characters in the check information field.

Figure 7B:
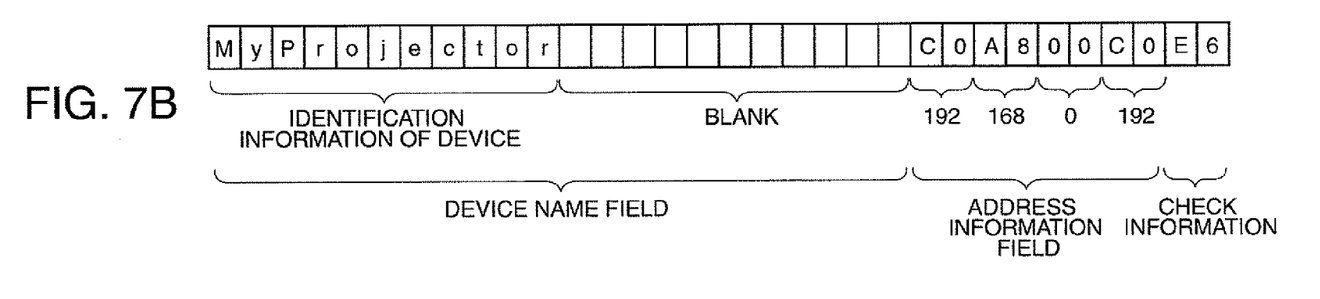
Figure 7C:
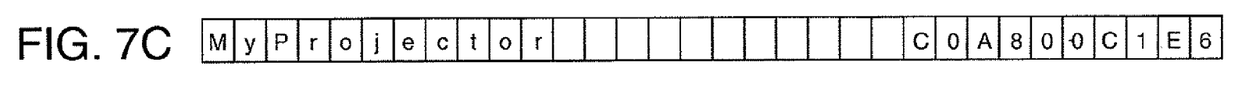
Figure 7D:
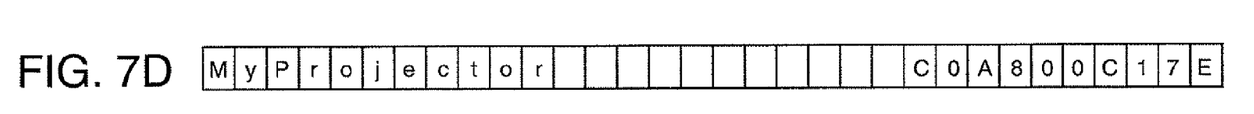

FIG. 7B is obtained by adding check information to an SSID of the first embodiment. The check information is calculated by using CRC-8, for example. FIG. 7C shows an SSID which the third party who has seen the SSID of FIG. 7B sets in another device. The SSID of FIG. 7C and the SSID of FIG. 7B have the same values in the device name field, but they have one different value in the address information field, and the device in which the third, party sets the SSID is a device different from the projector 20. Such a situation can occur when, for example, the third party tries to steal the information from the personal computer 10 by faking the SSID. However, since the SSID has a check information field, the CPU 100 of the personal computer 10 can easily determine whether or not the SSID is a faked SSID by comparing the check information calculated based on the values of the SSID and the values in the check information field of the SSID. As a result, the CPU 100 does not take part in the network with the faked SSID shown in FIG. 7C and does not transmit the data. Incidentally, FIG. 7D is obtained by providing a correct check information field to the SSID shown in FIG. 7C. As described above, according to the fourth embodiment, it is possible to find out the SSID faked by the third party. In this embodiment, CRC-8 is used for generating the check information; however, it is also possible to adopt other methods such as a checksum.

The technologies described in the above embodiments can be adopted independently. Therefore, arbitrary two or more technologies may be combined. For example, the address series of the second embodiment and the priority of the third embodiment may be combined. Moreover, in the embodiments described above, descriptions have been given by taking up a projector as an example; however, the projector may be replaced with a printer.

Although the invention has been described by way of embodiments, the embodiments described above are merely intended to make the invention more easily understandable, and are not meant to limit the scope of the invention in any way. It is to be understood that many modifications and variations are possible within the spirit of what is described herein and claimed in the appended claims, and the invention includes the equivalent thereof.

What is claimed is:

1. A wireless communication system which performs communication between first and second terminals, wherein
the first terminal
includes an identification information storing section storing identification information of the first terminal,
an IP address storing section storing an IP address of the first terminal,
a service set identifier generating section generating a service set identifier by using priority information indicating priority of wireless connection, the identification information, and the IP address,
a priority information updating section updating the priority information responsive to the service set identifier generating section generating a new service set identifier, and
a beacon signal generating section generating a beacon signal including the service set identifier, and
the second terminal includes
a service set identifier acquiring section acquiring the service set identifier from the beacon signal,
memory storing the service set identifier as a candidate for selection,
a service set identifier selecting section selecting, when a plurality of service set identifier candidates having the same identification information are stored in the memory, one service set identifier from the plurality of candidates based on a comparison between (i) a difference between a priority value of a first service set identifier candidate of the plurality of candidates and a priority value of a second service set identifier candidate of the plurality of candidates, and (ii) an absolute value of the difference between the priority value of the first service set identifier candidate and the priority value of the second service set identifier candidate,
an IP address acquiring section acquiring the IP address of the first terminal from the selected service set identifier, and
a communicating section making a connection to the first terminal by using the acquired IP address.

2. The wireless communication system according to claim 1, wherein
a firewall is set in the second terminal, and
the communicating section establishes wireless communication between the first and second terminals by transmitting a unicast packet including the IP addresses of the first and second terminals to the first terminal and receiving a response to the unicast packet from the first terminal.

3. The wireless communication system according to claim 1, wherein
the service set identifier includes check information for checking correctness of the service set identifier.

4. The wireless communication system according to claim 1, wherein
the first and second terminals each store an address series table for establishing correspondence between IP address related information and the IP address.

5. The wireless communication system according to claim 1, wherein the priority information updating section sets the priority information to zero when the IP address is changed and the priority field has acquired a predetermined value.

6. The wireless communication system according to claim 1, wherein the priority is calculated as being an absolute value of a difference between a first SSID priority value and a second SSID priority value.

7. A wireless communication device performing communication between first and second terminals, comprising:
   an identification information storing section storing identification information of the first terminal;
   an IP address storing section storing an IP address of the first terminal;
   a service set identifier generating section generating a service set identifier by using priority information indicating priority of wireless connection, the identification information, and the IP address;
   a priority information updating section updating the priority information responsive to the service set identifier generating section generating a new service set identifier;
   a beacon signal generating section generating a beacon signal including the service set identifier; and
   a communicating section that establishes communication between the first terminal and the second terminal, the communicating section selecting, when a plurality of service set identifier candidates having the same identification information are stored in a memory of the second terminal, one service set identifier from the plurality of candidates based on a comparison between (i) a difference between a priority value of a first service set identifier candidate of the plurality of candidates and a priority value of a second service set identifier candidate of the plurality of candidates, and (ii) an absolute value of the difference between the priority value of the first service set identifier candidate and the priority value of the second service set identifier candidate.

8. A projector projecting an image corresponding to received data, comprising:
   the wireless communication device according to claim 7, the wireless communication device for receiving the data;
   a CPU converting the received data into projection data; and
   an image projection mechanism projecting an image based on the projection data.

9. A wireless communication method for performing communication between first and second terminals, comprising:
   sending a beacon signal including a service set identifier including IP address related information related to an IP address of the first terminal, priority information indicating priority of wireless connection, and identification information of the first terminal;
   updating the priority information responsive to a new service set identifier being generated;
   acquiring the service set identifier from the beacon signal and storing the service set identifier in memory of the second terminal as a candidate for selection;
   when a plurality of service set identifier candidates having the same identification information are stored in the memory,
   selecting one service set identifier from the plurality of candidates based on a comparison between (i) a difference between a priority value of a first service set identifier candidate of the plurality of candidates and a priority value of a second service set identifier candidate of the plurality of candidates, and (ii) an absolute value of the difference between the priority value of the first service set identifier candidate and the priority value of the second service set identifier candidate;
   acquiring the IP address of the first terminal from the IP address related information of the selected service set identifier; and
   making a connection to the first terminal by using the acquired IP address.

10. The wireless communication method according to claim 9, wherein
    the second terminal
    sets a firewall,
    transmits a unicast packet including the IP addresses of the first and second terminals to the first terminal, and
    establishes wireless communication between the first and second terminals by receiving a response to the unicast packet from the first terminal.

11. The wireless communication method according to claim 9, wherein
    the service set identifier includes check information for checking correctness of the service set identifier.

12. The wireless communication method according to claim 9, wherein
    the first and second terminals establish correspondence between the IP address related information and the IP address.

* * * * *